United States Patent [19]

Mezzetti et al.

[11] 4,296,318

[45] Oct. 20, 1981

[54] OPTO-ELECTRONIC INSTRUMENT FOR REMOTE TEMPERATURE MEASUREMENT

[75] Inventors: Sergio Mezzetti, Rho; Pierluigi Pizzolati, Cernusco Sul Naviglio; Francesco Svelto, Rome, all of Italy

[73] Assignee: C.I.S.E. Centro Informazioni Studi Esperienze S.p.A., Italy

[21] Appl. No.: 78,322

[22] Filed: Sep. 24, 1979

[30] Foreign Application Priority Data

Sep. 22, 1978 [IT] Italy ............................. 28012 A/78

[51] Int. Cl.³ ............................................ G02F 1/01
[52] U.S. Cl. ................................ 250/225; 250/231 R; 73/355 R
[58] Field of Search ............... 250/227, 231 R, 226, 250/225; 350/147, 149, 158, 159; 73/154, 355 R, 355 EM; 356/364, 365

[56] References Cited

U.S. PATENT DOCUMENTS

3,453,434 7/1969 Takami et al. .................. 73/355 R
3,950,987 4/1976 Slezinger et al. .................. 250/225
4,140,393 2/1979 Cetas .................................. 73/355 R

*Primary Examiner*—David C. Nelms
*Attorney, Agent, or Firm*—Karl W. Flocks; A. Fred Starobin

[57] ABSTRACT

An opto-electronic instrument for remote temperature measurement having a measuring probe and a remote supply processing unit connected together by at least one optical fibre. The measuring probe includes at least one polarizer and a temperature sensitive element for receiving, modifying and retransmitting a luminous signal through the fibre which signal has been received from the luminous signal generator of the remote supply processing unit, which unit also includes a variable frequency filter controlled by a ramp generator for transforming the retransmitted luminous signal into a luminous signal, the intensity of which varies sinusoidally with time, and an opto-electrical transducer able to convert this latter luminous signal into a corresponding electrical signal of sinusoidal oscillation for which signal the period of oscillation is then calculated.

7 Claims, 8 Drawing Figures

OPTO-ELECTRONIC INSTRUMENT FOR REMOTE TEMPERATURE MEASUREMENT

This invention relates to an opto-electronic instrument for remote temperature measurement.

In many sectors of science and technology, there is the need for an accurate sensitive instrument able to operate in particularly adverse environments, and able to take measurements at distances exceeding a few hundred meters from the reading and data collection point.

This requirement is particularly felt in the geothermal field. In this respect, the possibility of optimising the working of a deposit, of evaluating the economics of a new region, and of advantageously initiating the large scale utilisation of dry rock wells is strictly related to the availability of instruments for measuring temperature, pressure, throughput, well diameter and the like which are able to operate up to 500° C.

Particularly with regard to temperature, it is very important to obtain temperature profiles as a function of depth, and to measure small variations at fixed points over long periods of time.

The temperature measuring instruments available at the present time use either resistance thermometers connected electrically to the surface instrument, or probes connected to a cable which is used only as a mechanical support, these probes containing a bimetallic spiral to which a point is fitted for scratching the oxide deposited on a plate driven by a clock mechanism.

However, in the first case, the insulating materials for the long wires are not able to support temperatures exceeding 250° C. In addition, any electromagnetic disturbances can make the measurement difficult or imprecise.

In the second case, the measurement can be read only after the probe has been withdrawn.

The object of the present invention is therefore to provide a temperature measuring instrument which can operate with extreme accuracy up to a high temperature and at a great distance, in real time.

According to the invention, this object is attained by an opto-electronic instrument, comprising a measuring probe and a remote supply and processing unit connected together by at least one optical fibre, said supply and processing unit including a luminous signal generator for said optical fibre, said measuring probe including at least one polariser and a temperature-sensitive element constituted by a square cross-section parallelepiped crystal of uniaxial double refraction material disposed with its optical axis at 45° to the plane of polarisation of said polariser, to receive the luminous signal transmitted through said optical fibre and to retransmit it to the same optical fibre in the form of a luminous signal the intensity of which varies sinusoidally with the wavelength, and in which the peaks are spaced apart by a distance dependent on the sensed temperature, said supply and processing unit including a variable frequency filter controlled by a ramp generator for transforming said retransmitted luminous signal into a luminous signal the intensity of which varies sinusoidally with time, an opto-electrical transducer able to convert this latter luminous signal into a corresponding electrical signal of sinusoidal oscillation, and means for calculating the period of oscillation of said electrical signal.

The instrument according to the invention is based substantially on the fact that when a parallelepiped crystal of uniaxial double refraction material is struck with a beam of light polarised at 45° (to the optical axis of the crystal), the crystal re-emits a luminous signal of which the intensity, after further 45° polarisation, varies sinusoidally with the wavelength used, its peaks being spaced apart by a distance which is a known function of the sensed temperature. By converting said luminous signal, the intensity of which varies sinusoidally with the wavelength, firstly into a corresponding luminous signal the intensity of which varies sinusoidally with time, and then into a further corresponding sinusoidal electrical signal, and suitably calculating the period of oscillation of this latter, it is possible to obtain a measurement which is a known function of the temperature sensed by the temperature-sensitive crystal.

Tests have shown that an instrument constructed in accordance with the invention is able to operate in real time up to about 500° C. with an accuracy of a few tenths of a degree and at a distance up to 2000 m.

The characteristics of the present invention will be more apparent from the detailed description given hereinafter of one possible embodiment thereof, with reference, by way of example only, to the accompanying drawings in which.

Figure 1:
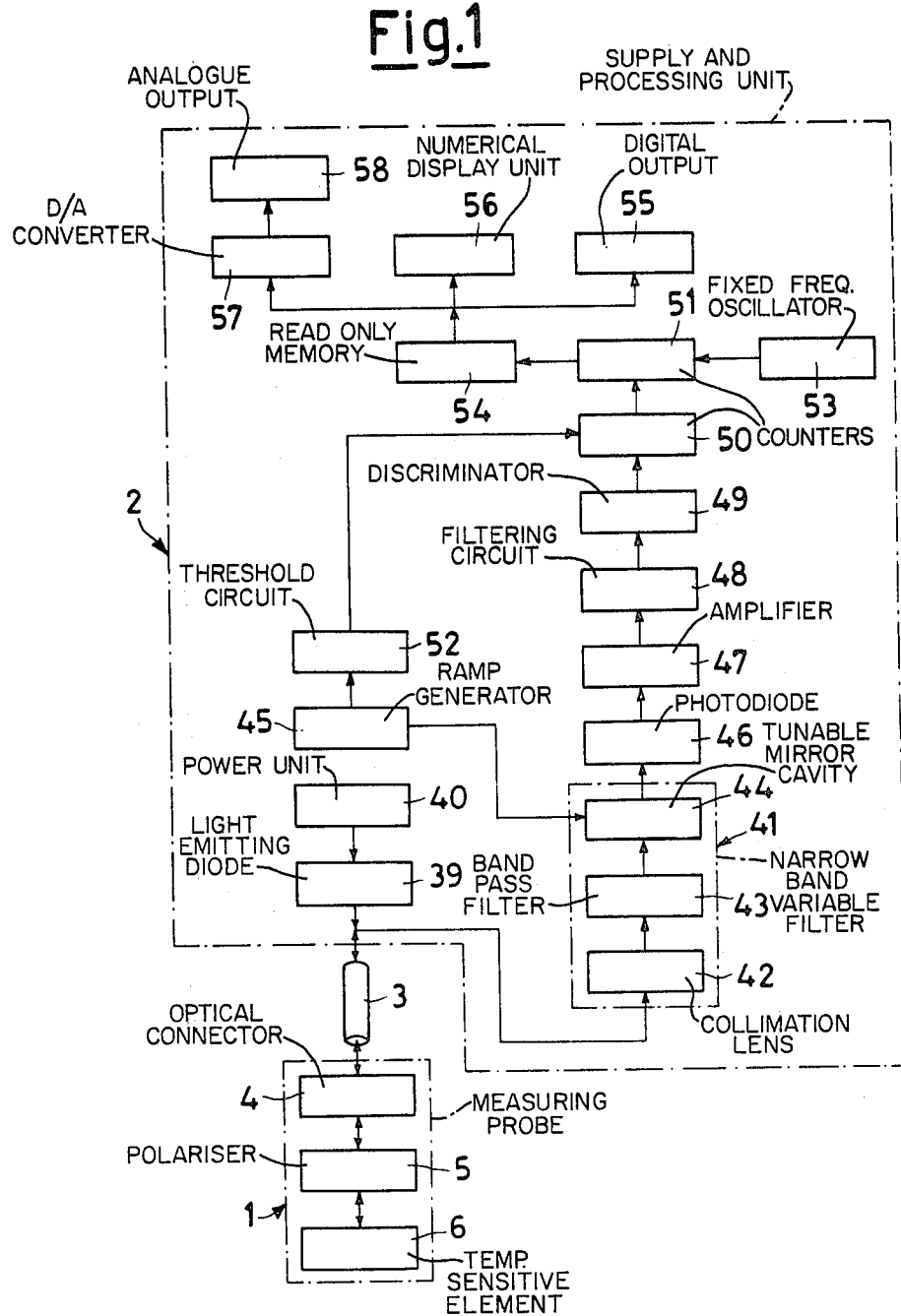
FIG. 1 is a basic block diagram of an opto-electronic instrument according to the present invention.

As shown in FIG. 1, the instrument in question generally comprises a measuring probe 1 and a supply and processing unit 2, said probe and said unit being connected together by an optical quartz fibre 3, the length of which can be chosen at will to enable the sensed temperature to be measured remotely by the probe 1 in any place of difficult access (generally a cavity in the ground).

The measuring probe 1 comprises, in succession, an optical connector 4 provided with a quartz collimating lens, a polariser 5 constituted by a Nicol prism, and a temperature-sensitive element 6 constituted by a square cross-section parallelepiped crystal of a uniaxial double refraction material, preferably lithium niobate, disposed with its optical axis at 45° to the polarisation plane of the polariser 5 and provided with a reflecting end face.

Figure 2:
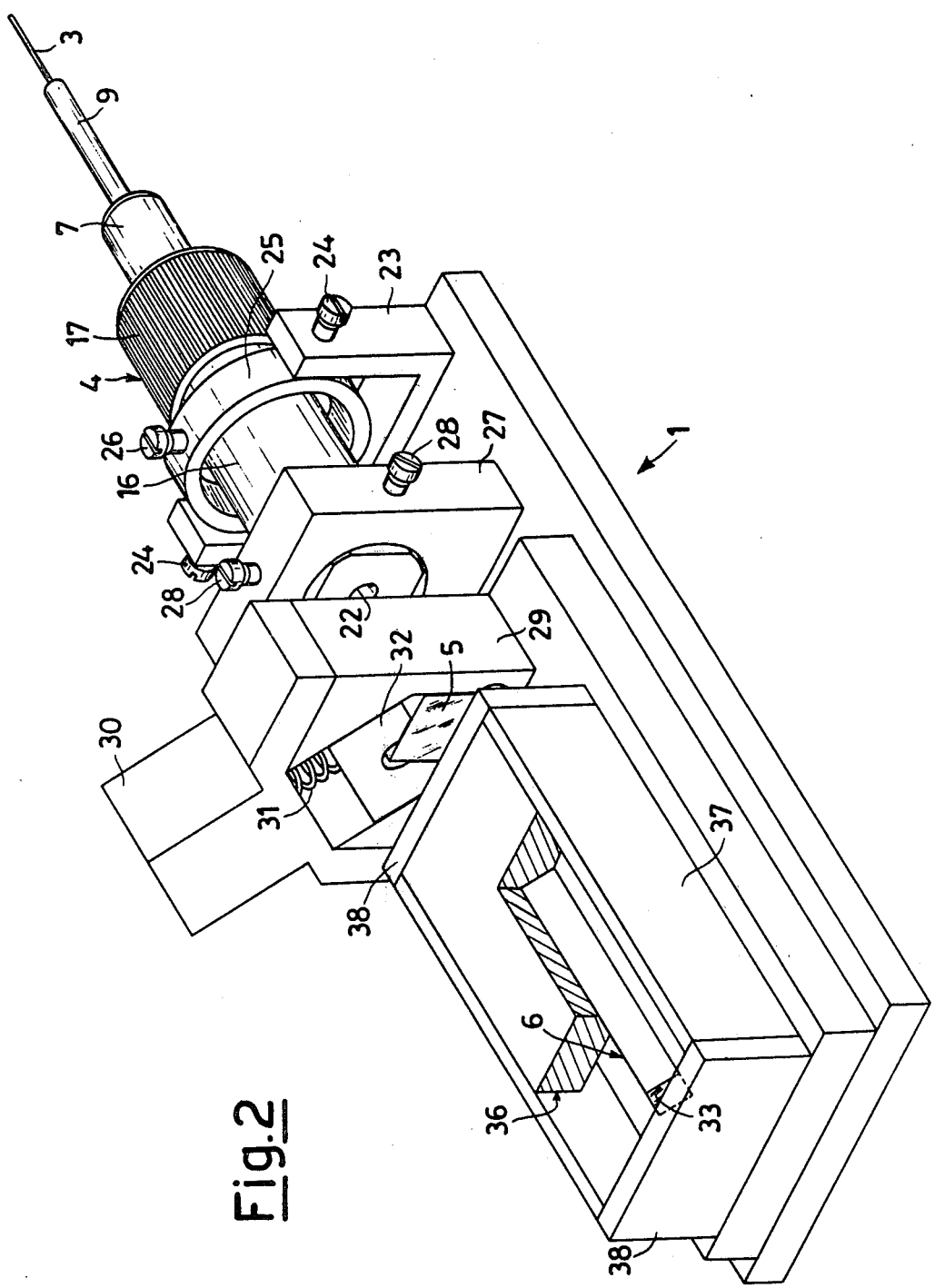
FIG. 2 is a perspective view of the mechanical structure of the measuring probe included in the instrument of FIG. 1.
Figure 3:
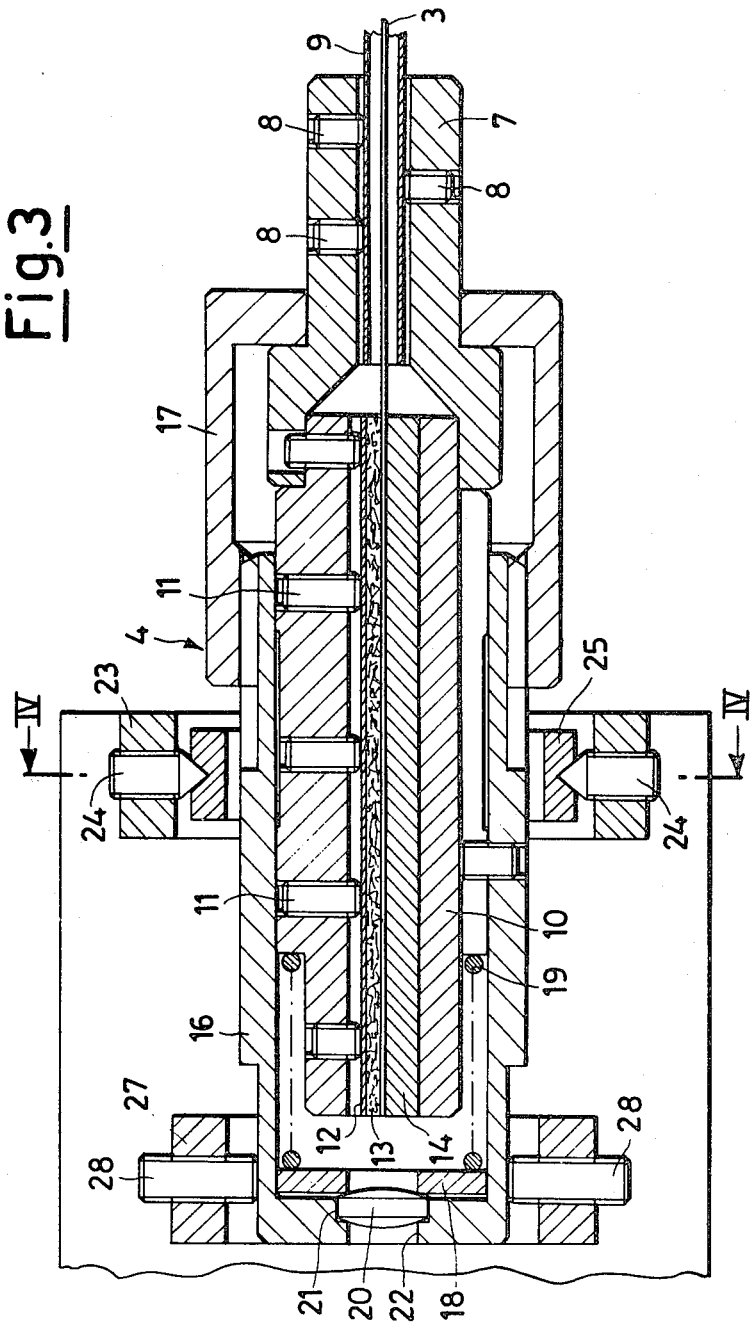
FIG. 3 is an axial section through an optical connector disposed at the joint between said measurement probe and the optical fibre which connects it to the supply and processing unit.
Figure 4:
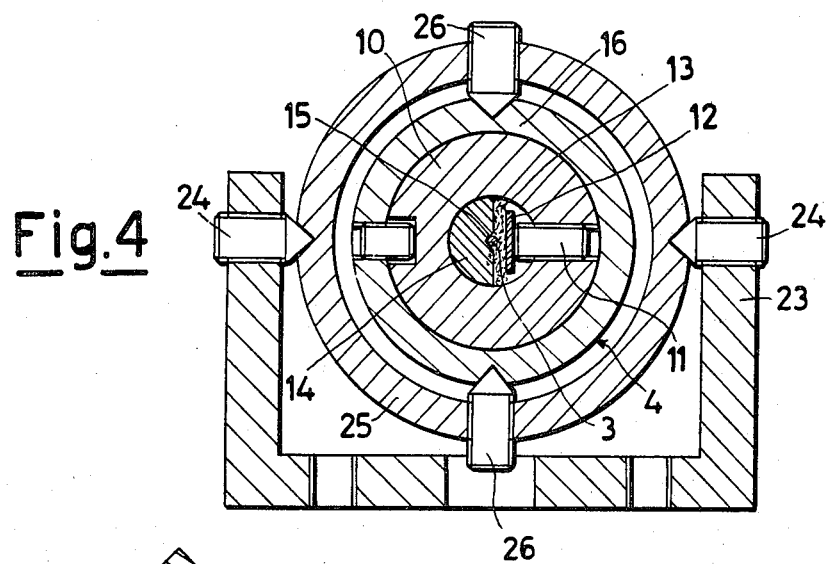
FIG. 4 is a cross-section through said optical connector on the line IV—IV of FIG. 3.

The mechanical structure of the measuring probe 1 can be seen from FIGS. 2 to 6, in which the optical connector 4 comprises a tubular inlet element 7 (FIGS. 2 and 3) which receives, and locks by means of grub screws 8, a flexible capillary tube 9 which contains and protects the optical fibre 3, and for this purpose is constructed of stainless steel able to resist a temperature considerably in excess of 500° C. without its characteristics changing. The tubular inlet element 7 is prolonged by a further tubular member 10, into which only the optical fibre 3 enters and terminates, and is held in close contact with an underlying support core 14 provided with a central groove 15, by means of a plurality of grub screws 11 acting against a strip 12 and a layer of glass wool 13 (FIGS. 3 and 4). Finally, there is provided an outer tubular member 16 which is kept mounted over the inner tubular member 10 to an adjustable extent by means of a ring nut 17. A washer 18 on which a spring 19 acts keeps the quartz collimating lens 20 (with a local length of 5 mm) in a suitable seat 21, which precedes an outlet bore 20 for the luminous signal originating from the optical fibre 3 and collimated by the lens 20. The position of the optical connecter 4 and thus of the lens 20 is adjusted micrometrically by way of a first support 23, which supports a ring 25 which is positioned by screws 24 and which is traversed in its turn by the central portion of the connector 4 (FIGS. 2 and 4), which is positioned by screws 26. A second support 27 is also provided, to support and position the terminal portion of the connector (FIG. 2) by means of screws 28.

Figure 5:
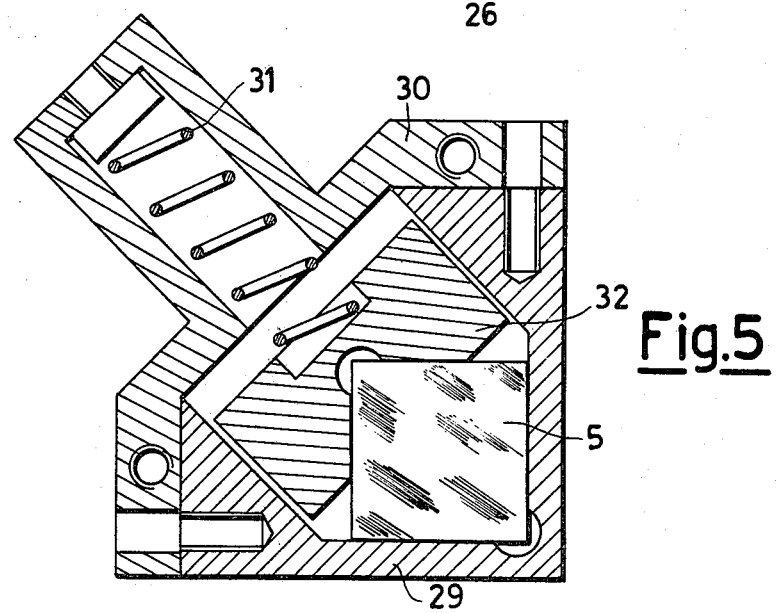
FIG. 5 is a cross-section through a polariser disposed between said optical connector and the temperature-sensitive crystal.

As shown in FIGS. 2 and 5, the polariser 5 is housed in a support comprising two cooperating elements 29 and 30, in which a pressure and positioning member 32 is housed and urged resiliently by a spring 31.

Figure 6:
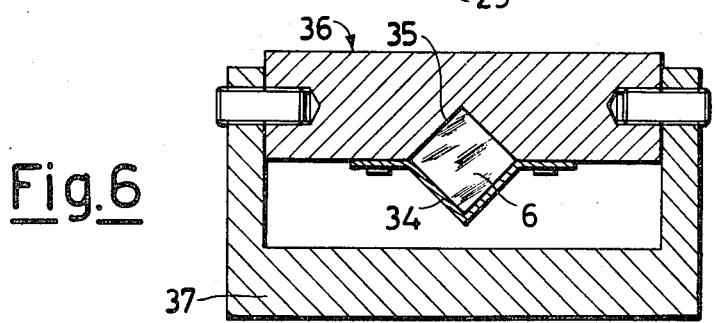
FIG. 6 is a cross-section through the temperature-sensitive crystal and its support.

Finally, FIGS. 2 and 6 show the uniaxial double refraction crystal 6, provided with a reflecting end face 33, housed and retained by one or more bands 34 in a V cavity 35 in a support plate 36, which upperly closes the inner compartment of an underlying housing 37 closed at its ends by plates 38. As stated, the crystal 6 is positioned so that its optical axis is at 45° to the polarisation plane of the polariser 5.

The supply part of the supply and processing unit 2 comprises a light emitting diode 39 activated by a power unit 40, and the processing part comprises a narrow band variable filter 41 (consituted in reality by a collimation lens 42, a band pass filter 43 with a band width of 40 Å centred at $0.9\mu$ and a tunable parallel mirror cavity 44, all disposed in succession to give rise to an output radiation line of 0.8 Å width) controlled by a ramp generator 45 (connected to a piezoelectric crystal), a photodiode 46, an amplifier 47, a continuous component filtering circuit 48, a discriminator 49 sensitive to zero crossings, and two counters 50 and 51, the first of which is activated by a threshold circuit 52 associated with the ramp generator 45 and arranged to count the periods of the output signal from the discriminator 49, and the second activated by the first counter 50 and arranged to count the pulses emitted by a set fixed frequency oscillator 53. At the outlet of the counter 51 there is provided a read-only memory 54, from which a digital output 55, a numerical display unit 56 and, by way of a digital-analogue converter 57, an analogue output 58 receive their data.

Figure 7:
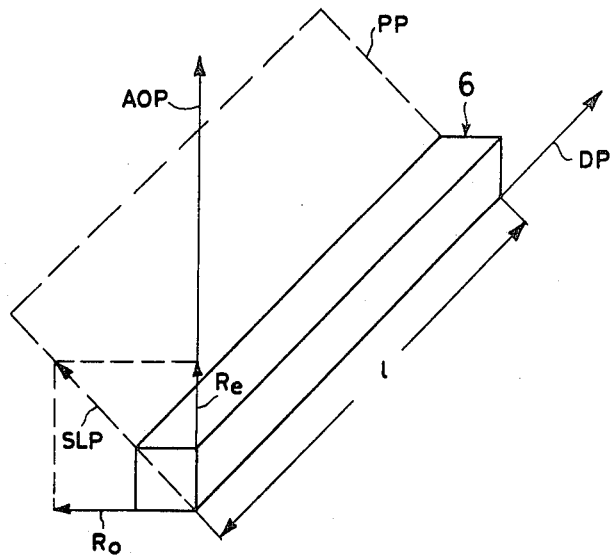
FIG. 7 is a diagrammatic illustration of the shape and method of operation of said temperature-sensitive crystal.

The method of operation of the instrument shown on the drawings is as follows. Under the control of the power unit 40, the light emitting diode 38 emits into the optical fibre 3 a luminous signal which the quartz lens 22 contained in the optical connector 4 collimates into a light beam parallel to the axis of the temperature-sensitive crystal 56. The collimated luminous signal is then polarised linearly by the Nicol prism (polariser) 5 and is fed to the lithium niobate crystal 6 along a polarisation plane (diagrammatically illustrated and indicated as PP in FIG. 7) disposed at 45° to the main optical axis (AOP) of the crystal 6. Here, the polarised luminous signal (SLP) splits into two waves (ordinary ray $R_o$ and extraordinary ray $R_e$), which are propagated in the direction DP in perpendicular planes with different refraction indices, $n_o$ and $n_e$, i.e. at different velocities, and are out of phase with time at the crystal outlet.

This phase displacement is equal to $$\delta = [2\pi l(n_o - n_e)]/\lambda$$

where l is the crystal length (FIG. 7) and $\lambda$ is the wavelength used.

By re-passing the re-emitted luminous signal through the polariser 5, a radiation is obtained at the outlet of intensity I, which depends on the phase displacement in accordance with the following sinusoidal relationship:

$$I = I_o \sin^2 \delta/2$$

Figure 8:
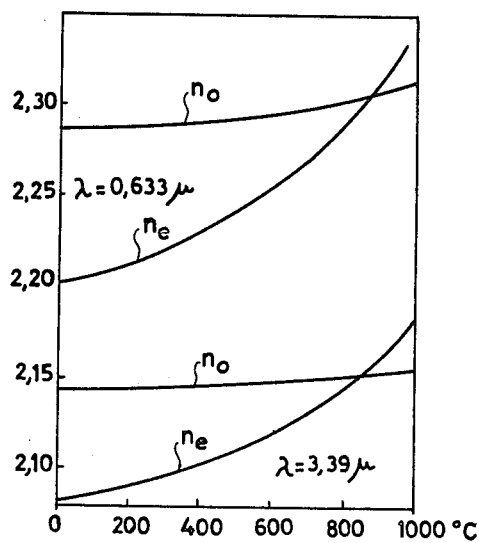
FIG. 8 is a graphical illustration of the manner in which the refraction index of the crystal varies with wavelength.

As is known, and as can be seen from FIG. 8, the difference $\Delta n = n_o - n_e$ varies with the wavelength and temperature. Consequently, if the wavelength used is continuously changed at a predetermined temperature, there is a corresponding variation in the phase displacement, and consequently the intensity I varies sinusoidally. Likewise, for different temperature values, the wavelengths are different at which I is a maximum. By scanning the same spectrum interval at the various temperatures, it is possible to obtain an unambiguous correspondence between the temperature and the distance $\Delta\lambda$ between two successive peaks of the signal of intensity I. This means substantially that the luminous signal re-emitted by the crystal 6 and polarised by the polariser 5 has an intensity I which varies sinusoidally with the wavelength, and has its peaks of maximum intensity spaced apart by a distance which depends only on the temperature, and therefore indicates the temperature sensed by the crystal 6.

The luminous signal of intensity I is focused by the lens 20 of the optical connector 4 at the inlet to the optical fibre 3, which in its turn feeds it to the supply and processing unit 2, to the inlet of the narrow band variable filter 41. The tunable cavity 44 of this latter is controlled by the ramp generator 45 in such a manner that for each voltage, the cavity and consequently the filter 41 is tuned to a different and well defined wavelength. Considering that the voltage generated is a known linear function of time, this means that the output signal from the variable filter 41 is still a luminous signal, but which has an intensity which is now a sinusoidal function of time, the peaks of which are spaced apart by a time interval which is an unambiguous function of the original wavelength difference and consequently of the sensed temperature.

This luminous signal is converted by the photodiode 46 (acting as an opto-electrical transducer) into a corresponding sinusoidal electrical signal, which is amplified by the amplifier 47, filtered and freed from the continuous component by the filter 48, and finally transformed into a square wave by the discriminator 49.

The period of this latter wave is measured, and this indicates the temperature as already stated. In order to obtain greater accuracy, this measurement is made not only for a single period, but for a predetermined number of periods. This is effected by the two counters 50 and 51, of which the first, activated by the threshold circuits 52 at the beginning of the voltage ramp of the generator 45, activates in its turn the second counter 51 so that it counts the pulses generated by the oscillator 53 until the first counter 50 has counted said predetermined number of periods.

The corresponding temperatures is obtained by the memory 54 from the number of counted pulses fed to it, and the temperature is represented visually in digital or analogue form by the output elements 55, 56 and 58.

What we claim is:

1. An opto-electronic instrument for remote temperature measurement, comprising a measuring probe and a remote supply and processing unit connected together by at least one optical fibre, said supply and processing unit includng a luminous signal generator for said optical fibre, said measuring probe including at least one polariser, and a temperature-sensitive element constituted by a square cross-section parallelepiped crystal of uniaxial double refraction material disposed with its optical axis at 45° to the plane of polarisation of said polariser, to receive the luminous signal transmitted through said optical fibre and to retransmit it to the same optical fibre in the form of a luminous signal the intensity of which varies sinusoidally with the wavelength, and in which the peaks are spaced apart by a distance dependent on the sensed temperature, said supply and processing unit including a variable frequency filter controlled by a ramp generator for transforming said retransmitted luminous signal into a luminous signal the intensity of which varies sinusoidally with time, an opto-electrical transducer able to convert this latter luminous signal into a corresponding electrical signal of sinusoidal oscillation, and means for calculating the period of oscillation of said electrical signal.

2. An instrument as claimed in claim 1, wherein said crystal of uniaxial double refraction material is a lithium niobate crystal.

3. An instrument as claimed in claim 2, wherein said lithium niobate crystal is provided with a reflecting end face.

4. An instrument as claimed in claim 2, wherein said polariser is a Nicol prism.

5. An instrument as claimed in claim 1, wherein said measuring probe comprises an optical connector provided with a quartz collimating lens and disposed between said optical fibre and said polariser.

6. An instrument as claimed in claim 1, wherein said variable filter comprises a collimation lens, a band pass filter and a tunable cavity controlled by said ramp generator in such a manner that for each voltage generated by this latter there is a corresponding different tuning wavelength of said cavity.

7. An instrument as claimed in claim 1, wherein said calculation means comprise a first counter activated by said ramp generator so that it counts a predetermined number of periods of oscillation of said electrical signal, and a second counter activated by the first counter so that it counts the pulses emitted by a fixed frequency oscillator until counting by said first counter terminates.

* * * * *